April 24, 1928.

L. W. EGGLESTON

VALVE

Filed April 28, 1926

1,667,698

INVENTOR.
Lewis W. Eggleston
BY
His ATTORNEY.

Patented Apr. 24, 1928.

1,667,698

UNITED STATES PATENT OFFICE.

LEWIS W. EGGLESTON, OF CLARENCE TOWNSHIP, ERIE COUNTY, NEW YORK, ASSIGNOR TO AMERICAN RADIATOR COMPANY, OF NEW YORK, N. Y., A CORPORATION OF NEW JERSEY.

VALVE.

Application filed April 28, 1926. Serial No. 105,056.

My invention relates broadly and generally to new and useful improvements in valves, and while it is particularly adapted for use as a pressure relief valve for relieving pressure in a chamber or conduit, it may with facility be employed for other purposes without departing from the spirit and scope of the invention.

The primary object of the invention is to provide a valve which will be simple in construction, comparatively cheap and easy to manufacture, and which will be certain and efficient in operation.

The invention consists in the improved construction and combination of parts and their aggroupment in operative combination, to be more fully described hereinafter, and the novelty of which will be particularly pointed out and distinctly claimed.

In the accompanying drawings to be taken as a part of this specification, I have fully and clearly illustrated a preferred embodiment of my invention, and in which drawings—

Figure 2:
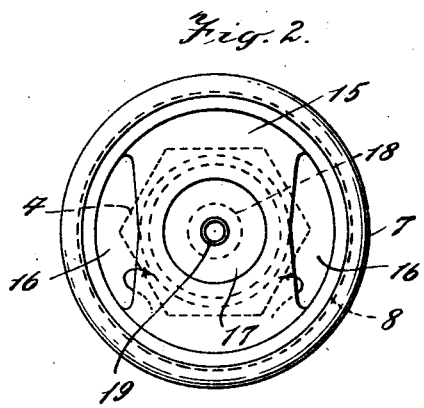
Fig. 2 is a top plan view of one of the parts or sections of the body or casing of the valve.

Referring to the drawings by characters of reference, A designates generally a casing or body preferably of cast-metal, and which may be of any suitable size and external configuration to suit it for the purposes for which it is employed. The body A preferably comprises a lower part or section 1, including an intermediate part 2 enclosing a flow chamber 3, which may be substantially circular in horizontal cross-section, as shown in Fig. 2, and with which is integrally formed an external nipple 4 having a central port or passage 5 which serves as an inlet when the device is employed as a pressure-relief valve. The nipple is preferably internally threaded, as at 6, whereby the body may be connected to an inlet pipe or other element communicating with a chamber in which there is a pressure of fluid to be controlled or relieved. The wall 2 is provided at its upper portion with an annular flange or extension 7 having an internal thread 8, and at the base of which is an internal annular shoulder or seat 9, for a purpose to be presently described. The casing or body is completed by an upper part 10 containing a flow chamber or passage 11, said part being in general circular in horizontal cross-section, and having at its lower end portion 10$^a$ an external thread 12 adapted to mesh with the threads 8 heretofore described, whereby the parts of the casing or body are assembled in fluid-tight relation to each other. The upper part 10 is provided with a connection, preferably in the form of a laterally directed nipple 13, internally threaded, as at 14, whereby the body may be connected to an outflow pipe, if desired, when the device is employed as a relief valve.

Figure 1:
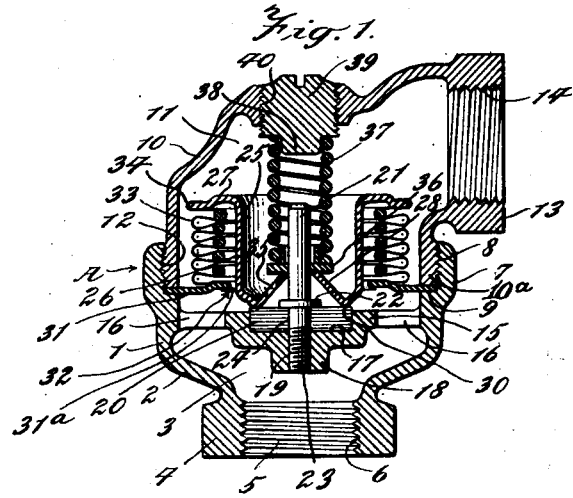
Figure 1 is a central vertical section through a structure embodying the invention.

The lower body section 2 is provided with a transverse partition or web 15, preferably cast integral with said part, and provided with one or more outer or peripheral ports or passages 16 communicating with the chamber 3. The upper face of the web or partition 15 is provided at its central portion with a preferably circular recess or pocket 17, and the under face of said web is provided with a downwardly extending boss 18 having a central threaded opening 19. Within the recess or pocket 17 is arranged a preferably flat circular disk 20 of suitable packing material, such for example as rubber, fiber, or other material suitable for the purpose, which disk serves as a valve surface or seat, as will be hereinafter described. The disk 20 is held rigidly in place, preferably by a vertical post member 21 extending above the web 15 into the casing part 10, said post having an intermediate shoulder 22 and a lower threaded extension 23, said extension being adapted to be passed through a central opening 24 in the seat disk 20, and be screwed into the boss 18. When the post member is screwed in place, as shown in Fig. 1, the shoulder 22 engages the upper face of the disk 20, whereby the latter is securely held in position.

Figure 3:
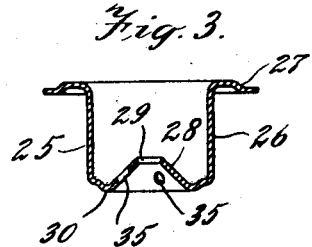
Fig. 3 is a transverse longitudinal section through a valve part and adapted to cooperate with the seat to control the flow or relief of a fluid through the valve casing.

Arranged in the casing and above the partition 15 is a valve member of novel form, adapted to cooperate with the upper face of the disk 20 to control flow from the chamber 3 through the port or ports 16 and from the casing. This valve member (see particularly Fig. 3) comprises a cup-shaped member 25, preferably struck up or drawn from suitable sheet-metal. The valve includes a substantially cylindrical intermediate wall 26 having at its upper end a laterally extending integral flange 27, and at its lower end closed by a re-entrant conical wall 28, said conical wall having at its central portion or apex a guide opening 29. The point at which the lower edge of the cylindrical wall 26 and the lower edge portion of the re-entrant bottom wall are merged or joined, is formed to constitute an annular valve face 30 of a diameter less than that of the seat disk 20 heretofore described, so as to seat within the circumference of said disk, as shown in Fig. 1. The valve member is arranged so as to be concentric with said disk 20, and with the central opening 29 fitting over the guide post 21 heretofore described, so that the valve will be held radially in proper relation to the upper face of the disk 20 and will be guided in its movements toward and away from said disk.

Clamped between the lower end portion 10ª of part 10 and the shoulder 9 heretofore described, is a ring or annular plate 31, which is provided with a central opening 31ª through which the valve 25 projects, said opening being of such diameter as to provide an annular flow space or passage between the inner edge of said plate and the outer face of said valve. Connected and sealed by any suitable means to the inner edge of the plate 31, as at 32, is the lower edge of an expansible-collapsible element, comprising a metallic cylindrical bellows 33 having parallel inward and outward corrugations or bends, rendering the same resilient, and expansible and collapsible longitudinally. The upper end of this bellows is connected and sealed, as at 34, to the outer edge of the flange 27 heretofore described, the arrangement being such that the bellows provides a fluid-tight connection between the plate 31 and flange 27. It will be seen that the bellows is arranged concentric to the cylindrical valve member and is spaced therefrom to form a pressure-receiving chamber surrounding the valve member, and which is open to the pressure of the medium within the chamber 3 and the valve body. Any pressure existing in chamber 3 will be exerted through the ports or passages 16 into the pressure chamber formed by the bellows and valve, and will tend to move the valve upward to open position relative to the seat 20.

The valve is provided with suitable ports 35 in the conical re-entrant wall 28, said ports being located between the valve face 30 and the center of said wall, so that when the valve is seated on the surface 20 flow will be cut off from said ports 35, but when the valve is lifted from its seat, the flow or pressure may pass beneath the face 30 into the space beneath the conical re-entrant wall 28 and out through the passages 35 and the passage through the valve body.

While I have shown and described the valve member as being cylindrical in form and having a lower annular edge adapted to seat on the surface 20, it will be understood that said hollow valve member need not necessarily be cylindrical in form, so long as it is tubular and provided with a seat-engaging face which is the equivalent of the face 30.

I will now describe preferred means for resisting the opening movement of the valve under pressures existing in the chamber 3, and for determining the point or pressure at which the valve will open: Slidably disposed upon the post 21 is an annular spring seat or collar 36 resting upon the upper inner edge of the re-entrant wall 28, as shown in Fig. 1. On the seat 36 is held the lower end of a compression spring 37, the upper end of which is seated on a suitable spring seat 38 on a plug 39, threaded, as at 40, into the upper wall of the casing part 10. It will be apparent that by screwing the plug 39 toward or away from the valve, the force of the spring may be regulated so as to determine the pressure at which the valve will be raised from its seat.

It is believed the operation will be apparent from the foregoing description when taken in connection with the drawings, but it may be briefly stated as follows: The parts being assembled as shown, the plug 39 is turned in one direction or the other so as to fix the resistance of the spring at such a point to correspond to the pressure at which it is desired the valve shall open. It will be understood that for pressures beneath that for which the spring is set, the spring serves to hold the valve in closed position, that is, with the valve face 30 in fluid-tight engagement with the upper face of the disk 20. So long as the pressure beneath the valve remains below the determined point, the valve is closed, but when the pressure exceeds the point for which the spring is set, said pressure will be exerted upon the expansible-collapsible element and the under face of the flange 27 to lift the valve, thereby removing the face 30 from the disk 20. The movement just described permits the pressure or flow to escape or be relieved by passing from chamber 3, through ports 16, beneath the valve face 30, through the ports 35, the hollow portion of the valve member and out through the upper casing part 10 and nipple 14. The valve remains open until the pressure drops below the point at which the spring is set, whereupon the spring exerts its force expansibly to move the valve to bring the seat 30 against the upper face of the disk 20 and thereby close or cut off the flow through the valve body.

Among other advantages possessed by the construction are the following: By the arrangement of the diaphragm or bellows external to the valve, and the provision of the flange 27, the area subjected to pressure may be made several times the area of the valve seat, so that the power or lifting force acting on the valve to raise it from its seat is increased in direct proportion to the increase in area—in other words, the area responsive to pressure may be made several times greater than is possible in those constructions wherein the valve face or disk alone is subjected to the pressure depended upon to open the same. This is accomplished by making the internal area of the flange 27 such that the power effect with respect to the area of the valve seat will be multiplied or increased so that a rise in pressure above the determined operating pressure will be certain to lift the valve from its seat.

A further advantage is that the valve seat being arranged above the chamber 3 is away from the circulation of water or fluid, which serves to a considerable degree to limit the formation of scale about the valve and seat, which formation might tend to seal the valve and prevent its opening movement at the desired pressure.

Another advantage is that the power of the pressure is multiplied to such an extent on the valve as to break the same loose from the disk 20, even though the valve become sealed by scale to the seat.

What I claim and desire to secure by Letters Patent of the United States is:—

1. A valve of the character described comprising a body having ports, a partition in said body and between said ports, said partition having a valve-engaging surface, and said body having a passage around said partition, a hollow valve member having a passage therethrough and having an end portion adapted to seat on said surface to prevent flow through said valve member, a flexible sealing element connecting said valve member to the body and exposed to pressure within the valve body, said valve member having a wall within said end portion and means opposing said pressure and engaging said wall to urge the valve member toward its seat on said surface.

2. A valve of the character described comprising a body having ports, a partition in said body and between said ports, said partition having a valve-engaging surface, and said body having a passage around said partition, a valve member having a passage therethrough and having an end portion adapted to seat on said surface to prevent flow through said valve member, said valve member having a guide opening, a flexible sealing element connecting said valve member to the body and exposed to pressure within the valve body, spring means opposing said pressure and urging the valve member toward its seat on said surface and guide means cooperating with the guide opening through said valve and with said spring means.

3. A valve of the character described comprising a body having an inlet port and an outlet port, a partition in said body between said ports, said partition having a valve-engaging surface, and said body having a passage around said partition, a hollow valve member having an end portion adapted to seat on said surface to prevent flow through said valve member, a flexible, expansible-collapsible element connecting the valve to the body and preventing flow therethrough except through said hollow valve and exposed to pressure exerted through said inlet port and the passage around said partition to move the valve member from its seat, a supporting collar within said hollow valve member and means engaging said collar for urging said valve member to its seat on said surface.

4. A valve of the character described comprising a body or casing having ports, a partition in said body and between said ports, said partition having a valve-engaging surface, and said body having a passage around said partition, a cup-shaped valve member having an annular portion adapted to seat on said surface and having a flow passage within said annular portion, a flexible, expansible-collapsible element surrounding said valve member and sealing the valve member to the body, said element forming a pressure chamber around the valve member, said pressure chamber being in communication with the said passage around said partition, guide means for said valve member and means for urging said valve member to its seat on said surface.

5. A valve of the character described comprising a body having ports, a partition in said body and between said ports, said partition having a valve-engaging surface, and said body having a passage around said partition, a cup-shaped valve member having an annular end portion adapted to seat on said surface and having an end wall provided with a port located within said annular end portion, a flexible, expansible-collapsible element connected to said valve member and sealing the valve member to the body, said element forming a pressure chamber around the valve member, said pressure chamber being in communication with said passage around said partition, and means for urging said valve member to its seat on said surface.

6. A valve of the character described comprising a body having ports, a partition in said body and between said ports, said partition having a valve-engaging surface, and said body having a passage around said partition, a cup-shaped valve member having an annular end portion adapted to seat on said surface and having an end wall provided with a port located within said annular end portion, a flexible, expansible-collapsible element connected to said valve member and sealing the valve member to the body, said element forming a pressure chamber around the valve member, said pressure chamber being in communication with said passage around said partition, guide means for said valve member, and means for urging said valve member to its seat on said surface.

7. A valve of the character described comprising a body having ports, a partition in said body and between said ports, said partition having a valve-engaging surface, and said body having a passage around said partition, a cup-shaped valve member having an annular end portion adapted to seat on said surface and having an end wall provided with a port located within said annular end portion, a guide post cooperating with said valve member, a flexible, expansible-collapsible element connected to said valve member and sealing the valve member to the body, said element forming a pressure chamber around the valve member, said pressure chamber being in communication with said passage around said partition, and means for urging said valve member to its seat on said surface.

8. A valve of the character described comprising a body having ports, a partition in said body and between said ports, said partition having a valve-engaging surface, and said body having a passage around said partition, a cup-shaped valve member having an annular end portion adapted to seat on said surface and having an end wall provided with a port located within said annular end portion, said end wall also having a guide opening, a guide post extending through said guide opening, a flexible, expansible-collapsible element connected to said valve member and sealing the valve member to the body, said element forming a pressure chamber around the valve member, said pressure chamber being in communication with said passage around said partition, and means for urging said valve member to its seat on said surface.

9. A valve of the character described comprising a body having ports, a partition in said body and between said ports, said partition having a valve-engaging surface, and said body having a passage around said partition, a cup-shaped valve member having an annular end portion adapted to seat on said surface and having an end wall provided with a port located within said annular end portion, said end wall also having a guide opening, a guide post supported on said partition and extending through said guide opening, a flexible, expansible-collapsible element connected to said valve member and sealing the valve member to the body, said element forming a pressure chamber around the valve member, said pressure chamber being in communication with said passage around said partition, and means for urging said valve member to its seat on said surface.

10. A valve of the character described comprising a body having ports, a partition in said body and between said ports, said partition having a valve-engaging surface, and said body having a passage around said partition, a cup-shaped valve member having at one end an annular portion adapted to seat on said surface and having an end wall provided with a port located within said annular end portion, the opposite end portion of said valve member having an external annular flange, a flexible, expansible-collapsible element connecting said annular flange to the body, said element, valve member and flange forming a pressure-receiving chamber concentric with the valve member and in communication with said passage through the body, and resilient means urging said valve member to its seat on said surface.

11. A valve of the character described comprising a body having ports, a partition in said body and between said ports, said body having a passage around said partition, the partition having a recess, a packing member in said recess, a cup-shaped valve member having an annular end portion adapted to seat on said packing, means to guide said valve and to retain said packing in said recess, said valve member having an annular external flange, a flexible member sealing said flange to the casing and preventing flow through the latter except through said valve member, and resilient means urging said valve member to its seat on said packing.

12. A valve of the character described comprising a body having ports, a partition in said body and between said ports, said partition having a valve-engaging surface, and the body having a passage around said partition, a cup-shaped valve member having an annular portion at one end adapted to seat on said surface, said valve member having an end wall provided with a flow port and a guide opening, a guide post mounted on said partition and extending through said guide opening, said valve member having an external annular flange, a flexible, expansible-collapsible element surrounding the valve member and sealing said flange to the body and forming a pressure chamber open to said passage around the partition, and a spring urging the valve member to its seat on the partition and opposing pressure in said pressure chamber.

13. A valve of the character described comprising a body having ports, a partition in said body and between said ports, said partition having a valve-engaging surface, and the body having a passage around said partition, a cup-shaped valve member having an annular portion at one end adapted to seat on said surface, said valve member having an end wall provided with a flow port and a guide opening, a guide post mounted on said partition and extending through said guide opening, said valve member having an external annular flange, a flexible, expansible-collapsible element surrounding the valve member and sealing said flange to the body and forming a pressure chamber open to said passage around the partition, and a spring mounted on said guide post, said spring urging the valve member to its seat on said surface and opposing pressure in said pressure chamber.

In testimony whereof I have hereunto signed my name.

LEWIS W. EGGLESTON.